United States Patent [19]

Zwicky

[11] Patent Number: 4,849,837
[45] Date of Patent: Jul. 18, 1989

[54] METHOD OF, AND APPARATUS FOR, RECORDING AUDIO SIGNALS USING RECORDING SIGNALS FREE OF AUDIO FREQUENCIES

[75] Inventor: Paul Zwicky, Dielsdorf, Switzerland

[73] Assignee: Willi Studer AG, Regensdorf, Switzerland

[21] Appl. No.: 79,795

[22] Filed: Jul. 27, 1987

[30] Foreign Application Priority Data

Aug. 12, 1986 [CH] Switzerland .......................... 3228/86

[51] Int. Cl.⁴ ................................................ G11B 5/02
[52] U.S. Cl. ........................................ 360/68; 360/30; 360/66
[58] Field of Search .................. 360/29, 30, 55, 66, 360/68

[56] References Cited

U.S. PATENT DOCUMENTS 2,727,096 12/1955 Singer .
2,829,209 4/1958 Crain .
2,986,608 5/1961 Pettus et al. .
3,009,025 11/1961 Takayanagi et al. .................. 360/29
3,324,250 6/1967 Skov ...................................... 360/68
3,435,135 3/1969 Yasuoka ................................ 360/29
4,081,845 3/1978 Braitberg ............................... 360/66
4,451,858 5/1984 Johnson, Jr. .
4,454,548 6/1984 Jensen ................................... 360/66
4,628,374 12/1986 Camras .

FOREIGN PATENT DOCUMENTS 60-223006 11/1985 Japan .
59-263201 6/1986 Japan ................................... 360/68

Primary Examiner—Vincent P. Canney
Assistant Examiner—Kevin J. Fournier
Attorney, Agent, or Firm—Werner W. Kleeman

[57] ABSTRACT

In order to record audio signals on a magnetic record carrier, there is produced a high frequency pulsed signal which contains the low frequency information pertinent to the audio signal. This high frequency pulsed signal is produced in a manner such as to be substantially free of any signal component which has a frequency lying in the frequency range of the low frequency audio signal. As a result, cross-talk produced during recording on a plurality of tracks can be substantially reduced.

9 Claims, 3 Drawing Sheets 4,849,837

METHOD OF, AND APPARATUS FOR, RECORDING AUDIO SIGNALS USING RECORDING SIGNALS FREE OF AUDIO FREQUENCIES

BACKGROUND OF THE INVENTION

The present invention relates to a new and improved method of, and apparatus for, recording an audio signal on a magnetic record carrier.

In the recording technology of magnetic tape devices, it is known to superimpose onto the low frequency audio signal a high frequency signal for the recording operation. Such high frequency signal may be sine-shaped or composed of square wave pulses as known, for example, from U.S. Pat. No. 4,451,858, granted May 29, 1984. In this case, the high frequency signal is modulated by the analog audio signal and there is thus produced a signal containing positive and negative pulses whose height or amplitude corresponds to the positive or negative excursion or variation of the analog audio signal.

However, this known recording technique leads to so-called cross-talk between tracks during recordal on two adjacent tracks of a multi-track record carrier and which tracks are intended for two different recordings. During such cross-talk, the audio signal, that is the low frequency signal is also recorded in a more or less attenuated form on the other track, where it is not wanted. This effect is even more pronounced when the low frequency audio signal contains more energy, in other words with increasing amplitude or intensity of such low frequency audio signal.

SUMMARY OF THE INVENTION

Therefore, with the foregoing in mind, it is a primary object of the present invention to provide a new and improved method of, and apparatus for, recording audio signals and which method and apparatus are not afflicted with the aforementioned drawbacks and shortcomings of the prior art.

Another important object of the present invention aims at the provision of a new and improved method of, and apparatus for, recording audio signals and which method and apparatus permit significantly reducing cross-talk during multi-track recording operations.

Now in order to implement these and still further objects of the invention which will become more readily apparent as the description proceeds, the method of the present development is manifested by the features that, there is produced and recorded a high frequency signal containing the low frequency information pertinent to the audio signal but substantially free of any signal component which has a frequency lying in the frequency range of the low frequency audio signal.

As alluded to above, the present invention is not only concerned with the aforementioned method aspects, but also relates to a novel construction of apparatus for recording an audio signal on a magnetic record carrier.

To achieve the aforementioned measures, the inventive apparatus, in its more specific aspects, comprises a series connection of:

a generating unit for producing a high frequency signal containing the low frequency information pertinent to the audio signal;

a removal unit for removing from the high frequency signal any signal component which has a frequency lying in the frequency range of the low frequency audio signal; and a recording unit for recording on a magnetic record carrier the remaining signal.

The advantages achieved by the invention are essentially seen in the fact that cross-talk during recording can be reduced by at least 30 dB. If in addition a clock track is provided on the record carrier, then, the cross-talk from this clock track can also be reduced by at least 30 dB. Furthermore, it is known that higher frequencies of the audio signal can also cause an additional premagnetization when such frequencies approach the frequency of the high frequency signal. This effect is prevent in accordance with the invention and there is thus improved the modulation or modulation control when using higher frequency audio signals.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that only enough of the construction of the inventive apparatus and the recorded signals have been shown as is needed for those skilled in the art to readily understand the underlying principles and concepts of the present development, while simplifying the showing of the drawings. Turning attention now specifically to FIG. 1 of the drawings, there has been illustrated therein by way of example and not limitation, a high frequency pulsed signal 1 consisting of positive pulses 2 and negative pulses 3 and which pulses appear at a predetermined substantially constant frequency as shown therein. The positive and negative pulses 2 and 3 alternate with and are separated from each other by pulse intervals or interpauses 4 having substantially zero amplitude. The pulse intervals or interpauses 4 collectively form a zero line 5.

Figure 2:
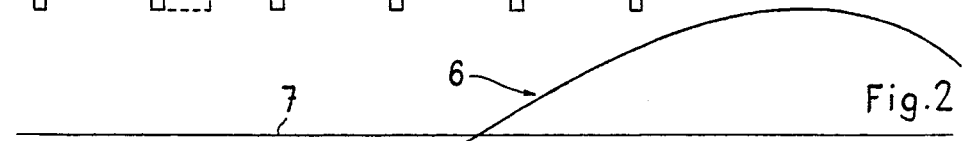
FIG. 2 shows the waveform of a part of an exemplary low frequency audio signal to be processed in accordance with the inventive method and apparatus.

FIG. 2 shows a part of an exemplary low frequency audio signal 6 which possesses positive and negative excursions or variations with respect to a zero line 7. The low frequency audio signal 6 constitutes an analog signal.

Figure 3:
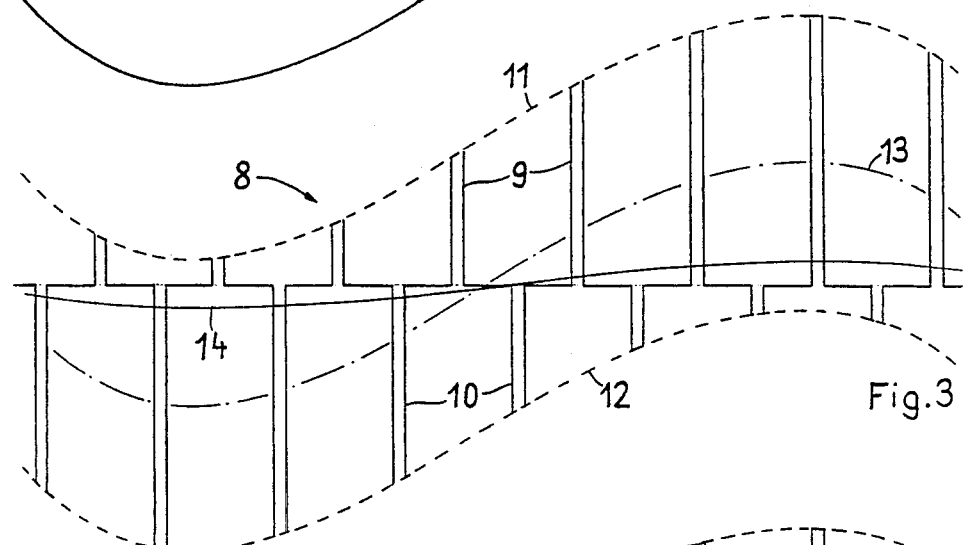
FIG. 3 shows the waveform of a high frequency pulsed signal which contains the low frequency information pertinent to the low frequency audio signal as shown in FIG. 2 and further containing a signal component which has a frequency lying in the frequency range of such audio signal.

FIG. 3 shows an exemplary high frequency pulsed signal 8 which contains the low frequency information pertinent to the low frequency audio signal 6. Such signal 8 arises from a combination of the high frequency pulsed signal 1 and the low frequency audio signal 6. The high frequency pulsed signal 1 is thus modulated by the low frequency audio signal 6. The combined high frequency pulsed signal 8 possesses alternating positive pulses 9 and negative pulses 10. The intensities or amplitudes of the positive pulses 9 and the negative pulses 10 follow respective envelope curves 11 and 12 each of which constitutes an image of the low frequency audio signal 6. A median line 13 likewise constitutes an image of the low frequency audio signal 6.

By adding the product composed of pulse duration and pulse amplitude of two successive pulses belonging to a period and by spreading the value of such product over the duration of such period, reduced amplitudes will result and a curve 14 will be obtained as an envelope. This curve 14 constitutes a low frequency signal substantially corresponding to the low frequency audio signal 6. In fact, the curve 14 represents a signal component which is contained in the combined high frequency pulsed signal 8 and has a frequency lying in the frequency range of the low frequency audio signal 6. It is this low frequency signal component which causes the cross-talk. This low frequency signal component must be suppressed or attentuated to such extent that cross-talk is prevented or at least partially inhibited.

Figure 4:
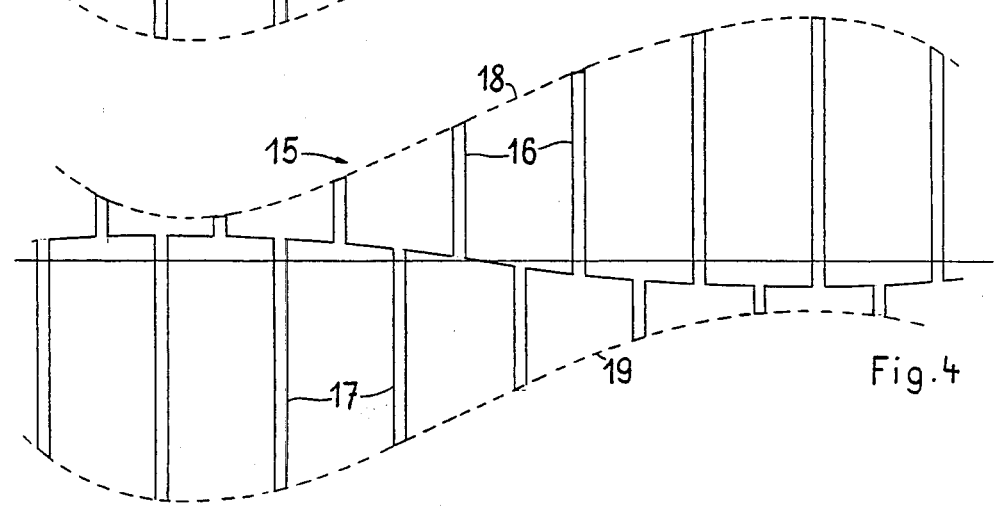
FIG. 4 shows the waveform of a signal derived from the signal shown in FIG. 3 by removing the aforementioned signal component.

FIG. 4 shows a further high frequency pulsed signal 15 which contains the low frequency information pertinent to the low frequency audio signal 6, but which does not contain or is substantially free of the low frequency signal component which has a frequency lying in the frequency range of the low frequency audio signal 6. The further high frequency pulsed signal 15 was derived, for example, from the combined high frequency pulsed signal 8 by completely attenuating or removing the aforementioned low frequency signal component which produces the undesired cross-talk. This removed signal component corresponds to the signal which is represented by the curve 14 in FIG. 3. The further high frequency pulsed signal 15 likewise possesses alternating positive pulses 16 and negative pulses 17. The intensities or amplitudes of the positive pulses 16 and the negative pulses 17 follow respective envelope curves 18 and 19 which do not conform with the envelope curves 11 and 12 shown in FIG. 3. In fact, all the envelope curves 11, 12, 18 and 19 have the same frequency but the envelope curves 11, 12 and 18, 19 do not have the same amplitude.

Figure 5:
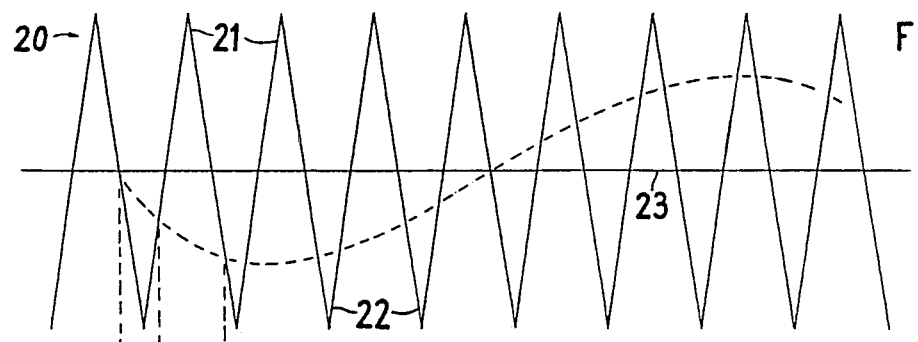
FIG. 5 shows the waveform of a further exemplary high frequency pulled signal to be processed in accordance with the inventive method and apparatus.

FIG. 5 shows as a further example of a high frequency pulsed signal a high frequency saw-tooth signal 20 which is known as such and comprises positive spikes or teeth 21 and negative spikes or teeth 22 relative to a zero line 23 and which spikes or teeth are seen to appear at a predetermined substantially constant frequency as shown in such FIG. 5.

FIG. 6 again shows the low frequency audio signal 6 with the zero line 7 as shown in FIG. 2.

Figure 7:
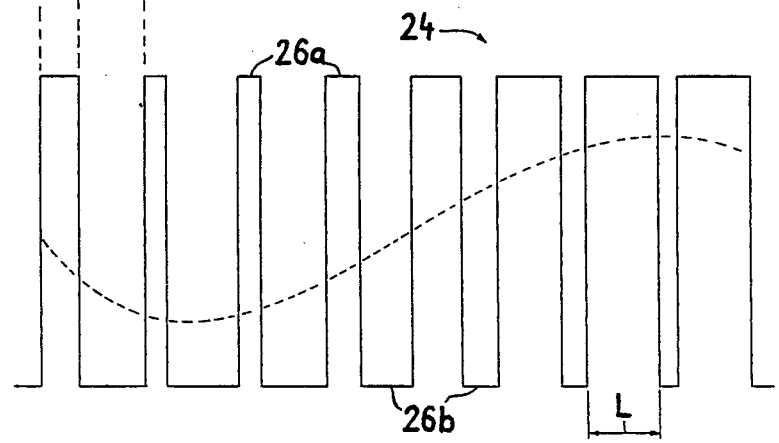
FIG. 7 shows the waveform of a high frequency pulsed signal which corresponds to the high frequency pulsed signal as shown in FIG. 3 and which signal is obtained from the high frequency signal as shown in FIG. 5 and contains the low frequency information pertinent to the audio signal shown in FIG. 6.

FIG. 7 shows a pulse duration-modulated high frequency signal 24 of a type which is known as such and which is produced from the high frequency saw-tooth signal 20 and the low frequency audio signal 6. This pulse duration-modulated high frequency signal 24 contains the low frequency information pertinent to the low frequency audio signal 6. This information is expressed by the varying pulse width or duration L of the positive pulses 26a or by the correspondingly varying pulse width of the negative pulses 26b, wherein the low frequency signal has a positive portion when the duration of the positive pulses is greater and where the low frequency signal has a negative portion when the duration of the negative pulses is greater. There is thus present in the pulse width or duration modulated high frequency pulsed signal 24 a low frequency signal component which has a frequency lying in the frequency range of the audio signal 6 and which must be removed or attenuated in order to prevent or at least substantially inhibit the undesired cross-talk.

Figure 8:
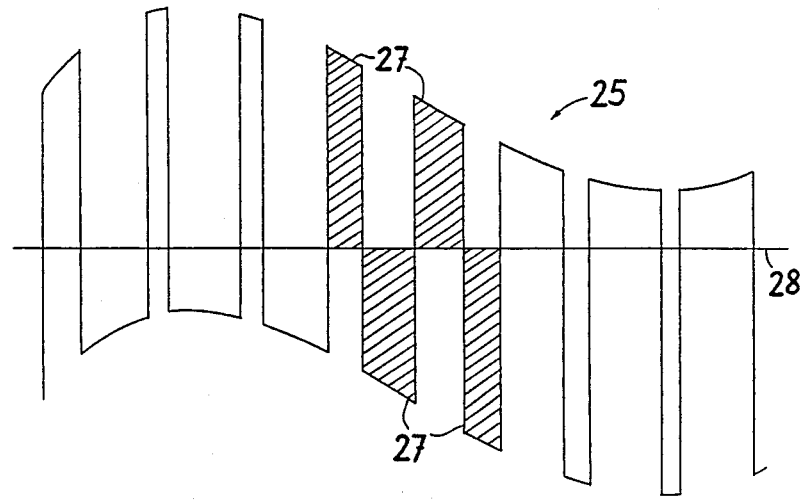
FIG. 8 shows the waveform of a further high frequency pulsed signal derived from the signal shown in FIG. 7 by removing the signal component which has a frequency lying in the frequency range of the audio signal as shown in FIG. 6.

FIG. 8 shows a pulse duration-modulated further high frequency pulsed signal 25 which is plotted on a zero line 28. This pulse duration-modulated further high frequency pulsed signal 25 is substantially free of the aforementioned signal component which has a frequency lying in the frequency range of the low frequency audio signal 6. The areas 27, which are bounded or formed by the individual pulses of the signal 25 and the zero line 28, correspond to the product of pulse duration and pulse amplitude. If it is assumed that one period extends over two consecutive pulses (comprising one negative pulse and one positive pulse), the sum of such areas 27 or products belonging to the same period is zero. The low frequency information pertinent to the low frequency audio signal 6 is therefore represented by the excursion or height of the individual pulses, since the pulse duration is the same as for the signal 24 in FIG. 7. The pulse width or duration-modulated further high frequency pulsed signal 25 is obtained from the high frequency pulsed signal 24 shown in FIG. 7 by subtracting therefrom a low frequency signal which corresponds to the low frequency audio signal 6 and has an appropriately selected intensity.

Figure 9:
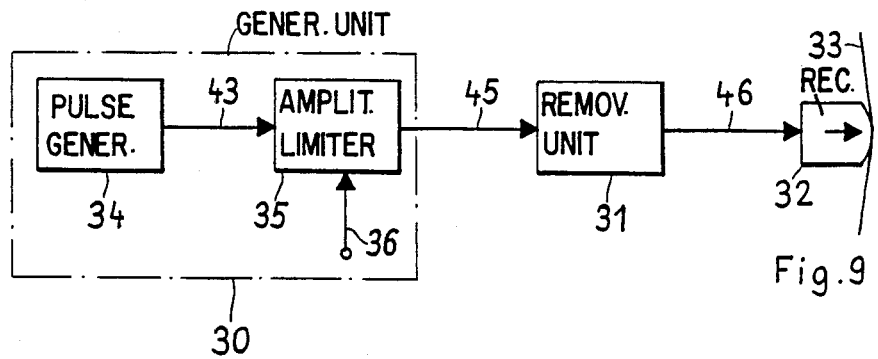
FIG. 9 is a schematic block circuit diagram of a first exemplary embodiment of the inventive apparatus.
Figure 10:
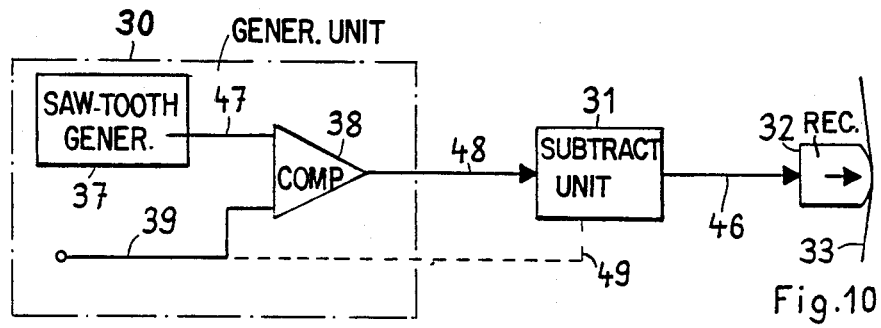
FIG. 10 is a schematic block circuit diagram of a second exemplary embodiment of the inventive apparatus.

Each one of FIGS. 9 and 10 show a schematic block circuit diagram of an exemplary embodiment of the inventive apparatus. Such inventive apparatus comprises a series connection of a generating unit 30 for producing a high frequency pulsed signal of the type as shown in FIGS. 3 and 7 and which signal contains the low frequency information pertinent to the low frequency audio signal 6, a removal unit 31 for removing the signal component such as represented, for example, by the curve 14 in FIG. 3 and which signal component has a frequency which lies in the frequency range of the low frequency audio signal 6, and a recording unit 32 for recording the remaining signal. A conventional recording head is provided as the recording unit 32 for recording on an appropriate multi-track magnetic record carrier 33.

In a first exemplary embodiment of the inventive apparatus illustrated in FIG. 9, the generating unit 30 comprises, for example, a pulse generator 34 and a variable amplitude limiter 35 containing an input 36 for infeeding the low frequency audio signal 6. In a second exemplary embodiment of the inventive apparatus as illustrated in FIG. 10, a saw-tooth generator 37 is used as the generating unit 30 as well as a comparator 38 containing an input 39 for infeeding the low frequency audio signal 6.

The removal unit 31 as shown in FIG. 9 comprises, for example, a suitable high-pass filter. However, the removal unit 31, as for the alternative embodiment of FIG. 10, may also be constructed as a subtraction circuit. In such case, the removal unit 31 also possesses an input 49 for infeeding a modified low frequency audio signal of reverse polarity and which is attenuated by a predeterminate factor. This modified low frequency audio signal is subtracted from the combined signal which is present on a line or conductor 48 interconnecting the comparator 38 and the removal unit 31. Such combined signal corresponds to the pulse duration-modulated high frequency pulsed signal 24 as shown in FIG. 7. Such signal 24 is produced by means of the comparator 38 which combines the high frequency saw-tooth signal 20 and the low frequency audio signal 6.

If the removal unit 31 is constructed, as explained previously, as a high-pass filter, it may be possibly important under certain circumstances that the signal contributing to the magnetization of the multi-track record carrier 33 be pulse-true or phase-linear. Circuits for producing such pulse-true or phase-linear signals are known, for example, from IEEE Transactions on Circuits and Systems, Volume CAS-29, Number 8, August 1982.

Figure 11:
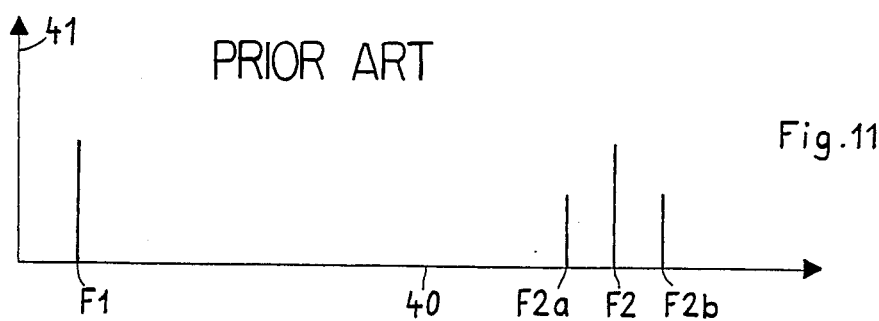
FIG. 11 is a graph showing the frequency spectrum of the high frequency pulsed signal obtained by prior art apparatus when superimposing an audio signal having the frequency F1 and a high frequency pulsed signal having the frequency F2.
Figure 12:
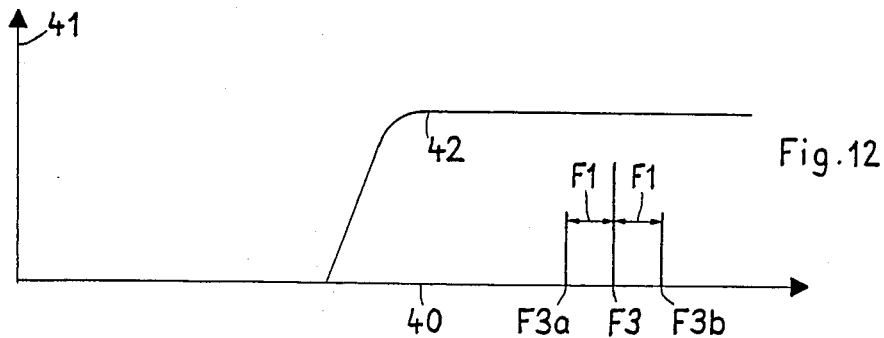
FIG. 12 is a graph showing the frequency spectrum of a high frequency pulsed signal obtained when using the inventive apparatus as shown in FIGS. 9 and 10.

FIGS. 11 and 12 are graphs showing frequency spectra of the produced high frequency signals. In such graphs frequency values are plotted along a horizontal axis or abscissa 40 and the signal amplitudes are plotted along a vertical axis or ordinate 41. FIG. 11 shows the frequency spectrum or frequencies produced when recording with prior art apparatus a low frequency audio signal like the low frequency audio signal 6 having the frequency F1 and superimposed with a high frequency pulsed signal such as the high frequency pulsed signal 1 or the saw-tooth high frequency pulsed signal 20 having the frequency F2. Side bands designated F2a and F2b are produced in such case by adding or subtracting the audio signal frequency F1 and the frequency F2 of the high frequency pulsed signal.

The frequency spectrum of the signals produced during recording in accordance with the invention is shown in FIG. 12. There will be recognized the frequency F3 of the high frequency signal such as the high frequency pulsed signal 1 or the saw-tooth high frequency pulsed signal 20 and side bands F3a and F3b occurring at a predetermined spacing from the frequency F3 and which predetermined spacing corresponds to the frequency F1 of the low frequency audio signal. The curve 42 represents the characteristic of the removal unit 31 when constituting a high-pass filter. Consequently, the audio signal frequency F1 is absent from the frequency spectrum of the high frequency signal such as the further high frequency pulsed signal 15 or 25, respectively, shown in FIGS. 4 and 8 and utilized for audio signal recording on the magnetic record carrier 33.

There will now be explained different manners of carrying out the inventive method which is essentially based on the recognition that the magnetization of a record carrier like the magnetic record carrier 33 is only influenced or affected by the succession or sequence of positive and negative excursions or pulses of a signal to be recorded such as the further high frequency pulsed signals 15 and 25, respectively, shown in FIGS. 4 and 8. What happens between the amplitude peaks of the signal has no influence on the magnetization of the multi-track record carrier 33. According to the invention, it is possible to produce a high frequency pulsed signal which contains the low frequency information pertinent to a low frequency audio signal like the low frequency audio signal 6 shown in FIGS. 2 and 6 without further containing low frequency signal components in its frequency spectrum. The low frequency information, for example, is only contained in the positive and negative excursions of the pulse peaks. Due to the fact that low frequency signal components are absent from the signal to be recorded no low frequency current which could produce cross-talk is produced by the signal utilized for the recording process. This can be achieved in one exemplary embodiment of the inventive method by ensuring that the product of pulse duration and pulse amplitude of two consecutive positive and negative pulses belonging to one period is small or preferably zero.

There exist different possibilities for producing multi-track magnetic recordings which are substantially free of cross-talk. Two specific methods of such type will be described hereinbelow with reference to FIGS. 1 to 12.

A first exemplary embodiment of the inventive method will now be explained with reference to FIGS. 1 to 4 and 9. When carrying out this method the pulse generator 34 provides, for example, the high frequency pulsed signal 1 at the variable amplitude limiter 35 via a conductor or line 43. This amplitude limiter 35 receives the analog low frequency audio signal 6 at the input 36 and produces the combined or amplitude-modulated high frequency pulsed signal 8 by varying the excursions of the individual alternating positive and negative pulses 2 and 3 of the high frequency pulsed signal 1. The peaks of the pulses 9 and 10 in the combined high frequency pulsed signal 8 thus follow the respective envelope curves 11 and 12 which, for their part, follow the excursion of the low frequency audio signal 6, see FIG. 3. If the width B of the pulses 2 and 3 of the high frequency signal 1 and correspondingly the width also of the pulses 9 and 10 of the combined or amplitude-modulated high frequency pulsed signal 8 is selected to be relatively small, then, the combined high frequency pulsed signal 8 comprises only a low intensity signal component which has a frequency lying in the frequency range of the low frequency audio signal 6 and which is represented by the curve 14 in FIG. 3. Such signal component has only a small excursion or amplitude.

Figure 1:
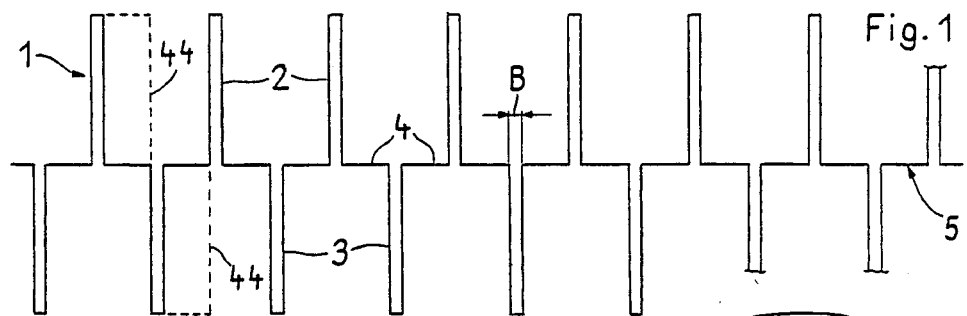
FIG. 1 shows the waveform of an example of a high frequency pulsed signal to be processed in accordance with the inventive method and apparatus.

If a maximum width of the pulses 2 and 3 and, therefore, also of the pulses 9 and 10 is selected such as indicated in FIG. 1 by the pulses which correspond to the broken line 44, then, the component of the recording current produced by the signal component represented by the curve 14 in FIG. 3 disappears and the signal component corresponding to the curve 14 now is represented by the median line 13 shown in FIG. 3. However, constructing the inventive apparatus such that the inventive method is carried out in this manner, is undesirable since there are no advantages offered with respect to the prior art. In contrast thereto, when carrying out the inventive method, the pulses 2 and 3 of the high frequency pulsed signal 1 have only a comparatively small width or duration B resulting in a comparatively low intensity of the aforementioned low frequency signal component which is of the type as represented by the curve 14 in FIG. 3.

The thus obtained combined or amplitude-modulated high frequency pulsed signal 8 is subsequently supplied via a line or conductor 45 to the removal unit 31 here constituting, for instance, a high pass filter. Therein the combined high frequency pulsed signal 8 is converted into a further amplitude-modulated high frequency pulsed signal 15, see FIG. 4. When the pulses 2 and 3 of the high frequency pulsed signal 1 are selected such as to not possess maximum width or duration B, the information pertinent to the low frequency audio signal 6 is still retained in the further amplitude-modulated high frequency pulsed signal 15 due to the excursions of the pulse peaks 16 and 17 which follow the respective envelope curves 18 and 19. The further high frequency pulsed signal 15 is supplied via a line or conductor 46 to the recording head 32 which magnetizes the record carrier 33. The recording is thus produced without cross-talk because the further high-frequency pulsed signal 15 is substantially free of any signal component having a frequency lying in the frequency range of the low frequency audio signal 6 and which could produce a low frequency magnetization current.

The removal of the low frequency signal component which causes the undesired cross-talk is effected in known manner according to the filter characteristic as shown in FIG. 12.

Figure 6:
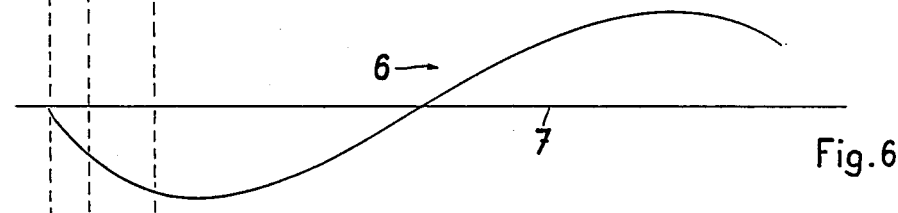
FIG. 6 shows the waveform of the low frequency audio signal as shown in FIG. 2.

The second exemplary embodiment of the inventive method will now be explained with reference to FIGS. 5 to 8 and 10. In this embodiment the saw-tooth generator 37 produces a saw-tooth high frequency pulsed signal 20, see FIG. 5, which is supplied via a line or conductor 47 to a comparator 38. The low frequency audio signal 6, see FIG. 6, is also fed to the comparator 38 via line or conductor 39. The comparator 38 produces from the incoming signals 20 and 6 in known manner a pulse width or duration-modulated high frequency pulsed signal 24, see FIG. 7. This high frequency pulsed signal 24 is supplied via a line or conductor 48 to the removal unit 31 here constituting, for instance, a subtraction unit where the low frequency signal component is eliminated. There is thus produced a pulse width or duration-modulation further high frequency pulsed signal 25, see FIG. 8. In this further high frequency pulsed signal 25 the energy of the pulses is always zero when integrated over an appropriately selected time interval. The low frequency information pertinent to the low frequency audio signal 6 also in this case is contained in the excursion or variation of the pulse peaks.

While there are shown and described present preferred embodiments of the invention, it is to be distinctly understood that the invention is not limited thereto, but may be otherwise variously embodied and practiced within the scope of the following claims.

Accordingly, what is claimed is:

1. A method of recording an audio signal on a magnetic record carrier, comprising the steps of:
    producing a high frequency signal having a predetermined substantially constant frequency and containing low frequency information pertinent to a predeterminate low frequency audio signal as well as a signal component having a frequency which lies in the frequency range of said low frequency audio signal;
    producing from said high frequency signal a further high frequency signal which is substantially free of said signal component having said frequency which lies in the frequency range of said low frequency audio signal;
    recording the thus produced further high frequency signal;
    said step of producing said high frequency signal entails combining a high frequency signal having said predetermined substantially constant frequency with said low frequency audio signal and thereby producing said high frequency signal containing the low frequency information pertinent to said predeterminate low frequency audio signal and further containing said signal component having the frequency which lies in the frequency range of said low frequency audio signal; and
    during said step of producing said further high frequency signal, removing from the high frequency signal said signal component having the frequency which lies in the frequency range of said low audio signal.

2. The method as defined in claim 1, wherein:
    said step of producing said high frequency signal having said predetermined substantially constant frequency entails producing as said high frequency signal a high frequency pulsed signal comprising alternating positive and negative pulses;
    said step of producing said further high frequency signal including the step of producing as said further high frequency signal a high frequency pulsed signal comprising alternating positive and negative pulses and being substantially free of said signal component; and
    said step of recording said further high frequency signal entailing the step of recording said alternating positive and negative pulses of said further high frequency pulsed signal.

3. The method as defined in claim 1, wherein:
    said step of removing said signal component having the frequency which lies in the frequency range of said low frequency audio signal entails filtering said high frequency signal produced from said high frequency signal having said predetermined substantially constant frequency.

4. A method of recording an audio signal on a magnetic record carrier, comprising the steps of:
    producing a high frequency signal containing low frequency information pertinent to a predetermined low frequency audio signal;

producing from said high frequency signal a further high frequency signal which is substantially free of any signal component having a frequency which lies in the frequency range of said low frequency audio signal;

recording the thus produced further high frequency signal;

said step of producing said high frequency signal entailing the step of combining a predetermined high frequency signal with said low frequency audio signal and thereby producing said high frequency signal containing the low frequency information pertinent to said predeterminate low frequency audio signal and further containing said signal component having the frequency which lies in the frequency range of said low frequency audio signal;

during said step of producing said further high frequency signal, removing from the high frequency signal said signal component having the frequency which lies in the frequency range of said low frequency audio signal; and said step of combining said predetermined high frequency signal and said low frequency audio signal entailing the step of selecting as said predetermined high frequency signal a high frequency pulsed signal and modulating the pulse widths of said high frequency pulsed signal as a function of said low frequency audio signal.

5. A method of recording an audio signal on a magnetic record carrier, comprising the steps of:

producing a high frequency signal containing low frequency information pertinent to a predeterminate low frequency audio signal;

producing from said high frequency signal a further high frequency signal which is substantially free of any signal component having a frequency which lies in the frequency range of said low frequency audio signal;

recording the thus produced further high frequency signal;

said step of producing said high frequency signal entailing the step of combining a predetermined high frequency signal with said low frequency audio signal and thereby producing said high frequency signal containing the low frequency information pertinent to said predeterminate low frequency audio signal and further containing said signal component having the frequency which lies in the frequency range of said low frequency audio signal;

during said step of producing said further high frequency signal, removing from the high frequency signal said signal component having the frequency which lies in the frequency range of said low frequency audio signal;

said step of producing said predetermined high frequency signal entailing the step of producing as said predetermined high frequency signal a high frequency signal comprising alternating positive and negative pulses;

said step of combining said predetermined high frequency signal and said low frequency audio signal entailing the step of modulating the amplitude of said alternating positive and negative pulses by said low frequency audio signal so that said low frequency information pertinent to said low frequency audio signal is contained in the amplitudes of said alternating positive and negative pulses of said high frequency pulsed signal; and separating said alternating positive and negative pulses by substantially zero amplitude intervals.

6. A method of recording an audio signal on a magnetic record carrier, comprising the steps of:

producing a high frequency signal containing low frequency information pertinent to a predetermined low frequency audio signal;

producing from said high frequency signal a further high frequency signal which is substantially free of any signal component having a frequency which lies in the frequency range of said low frequency audio signal;

recording the thus produced further frequency signal;

said step of producing said high frequency signal entailing the step of combining a predetermined high frequency signal with said low frequency audio signal and thereby producing said high frequency signal containing the low frequency information pertinent to said predeterminate low frequency audio signal and further containing said signal component having the frequency which lies in the frequency range of said low frequency audio signal;

during said step of producing said further high frequency signal, removing from high frequency signal said signal component having the frequency which lies in the frequency range of said low frequency audio signal; and said step of producing said high frequency signal entailing the step of producing a high frequency pulsed signal containing pulses of a predetermined small pulse duration in order to limit the formation of said signal component having the frequency which lies in the frequency range of said low frequency audio signal.

7. An apparatus for recording an audio signal on a magnetic record carrier, comprising:

a generating unit for producing a high frequency signal which contains low frequency information pertinent to a predeterminate low frequency audio signal;

a removal unit for removing from said high frequency signal component having a frequency which lies in the frequency range of said low frequency audio signal and producing a further high frequency signal;

said removal unit being series connected to said generating unit;

a recording unit for recording on a magnetic record carrier said further high frequency signal produced by said removal unit and substantially free of said signal component having the frequency which lies in the frequency range of said low frequency audio signal;

said recording unit being series connected to said removal unit; and said generating unit for producing said high frequency signal comprising a signal generator and an input for receiving said low frequency audio signal.

8. An apparatus for recording an audio signal on a magnetic record carrier, comprising:

a generating unit for producing a high frequency signal which contains low frequency information pertinent to a predeterminate low frequency audio signal;

a removal unit for removing from said high frequency signal a signal component having a frequency which lies in the frequency range of said low frequency audio signal and producing a further high frequency signal;

said removal unit being series connected to said generating unit;

a recording unit for recording on a magnetic record carrier said further high frequency signal produced by said removal unit and substantially free of said signal component having the frequency which lies in the frequency range of said low frequency audio signal;

said recording unit being series connected to said removal unit;

said removal unit for removing said signal component having the frequency which lies in the frequency range of said low frequency audio signal comprising a subtraction unit; and said removal unit comprising an input for receiving said low frequency audio signal.

9. An apparatus for recording an audio signal on a magnetic record carrier, comprising:

a generating unit for producing high frequency signal which contains low frequency information pertinent to a predeterminate low frequency audio signal;

a removal unit for removing from said high frequency signal component having a frequency which lies in the frequency range of said low frequency audio signal and producing a further high frequency signal;

said removal unit being series connected to said generating unit;

a recording unit for recording on a magnetic record carrier said further high frequency signal produced by said removal unit and substantially free of said signal component having the frequency which lies in the frequency range of said low frequency audio signals;

said recording unit being series connected to said removal unit;

said removal unit for removing said signal component having the frequency which lies in the frequency range of said low frequency audio signal, comprising a subtraction unit; and said removal unit comprising an input for receiving a signal derived from said low frequency audio signal.

* * * * *